(12) United States Patent
Van Rensburg

(10) Patent No.: US 8,047,380 B2
(45) Date of Patent: Nov. 1, 2011

(54) SCREEN PANELS

(75) Inventor: Jacobus Strydom Janse Van Rensburg, Alberton (ZA)

(73) Assignee: Screenex Manufacturing (Pty) Ltd., Alberton (ZA)

( * ) Notice: Subject to any disclaimer, the term of this patent is extended or adjusted under 35 U.S.C. 154(b) by 0 days.

(21) Appl. No.: 12/162,842

(22) PCT Filed: Feb. 15, 2008

(86) PCT No.: PCT/IB2008/050558
§ 371 (c)(1),
(2), (4) Date: Jul. 31, 2008

(87) PCT Pub. No.: WO2009/101482
PCT Pub. Date: Aug. 20, 2009

(65) Prior Publication Data
US 2010/0300943 A1    Dec. 2, 2010

(51) Int. Cl.
*B07B 1/49* (2006.01)
(52) U.S. Cl. ........ 209/397; 209/392; 209/393; 209/404; 209/405
(58) Field of Classification Search .......... 209/392, 209/393, 397, 400
See application file for complete search history.

(56) References Cited

U.S. PATENT DOCUMENTS

| | | | | |
|---|---|---|---|---|
| 4,486,302 A * | 12/1984 | Jorgensen | ...................... | 209/399 |
| 5,045,184 A * | 9/1991 | Arkles | .......................... | 209/405 |
| 5,082,609 A * | 1/1992 | Rohrlach et al. | ............. | 264/46.4 |
| 6,220,448 B1 * | 4/2001 | Bakula et al. | ................. | 209/392 |
| 6,253,926 B1 * | 7/2001 | Woodgate | ..................... | 209/399 |
| 6,736,271 B1 * | 5/2004 | Hall | .............................. | 209/409 |
| 7,303,079 B2 * | 12/2007 | Reid-Robertson et al. | ... | 209/405 |
| 7,467,715 B2 * | 12/2008 | Johnson et al. | ............... | 209/405 |
| 7,527,865 B2 * | 5/2009 | Kessing | ..................... | 428/423.3 |
| 7,850,010 B2 * | 12/2010 | Takev | ........................... | 209/393 |

FOREIGN PATENT DOCUMENTS

| | | |
|---|---|---|
| EP | 1 747 870 A1 | 1/2007 |
| JP | 50151974 A | 5/1974 |
| KR | 20040049947 A | 12/2002 |
| KR | 20040098462 A | 5/2003 |
| WO | 00/39206 A1 | 7/2000 |

OTHER PUBLICATIONS

UK Search Report received in corresponding Application No. GB0805249.0 dated Jul. 17, 2008.

* cited by examiner

*Primary Examiner* — Terrell Matthews
(74) *Attorney, Agent, or Firm* — Wong, Cabello, Lutsch, Rutherford & Brucculeri, L.L.P.

(57) ABSTRACT

The invention concerns screen panels of the kind used in vibratory screening operations. According to the invention, the screen panels (10) include recycled polyurethane, typically that recovered from worn screen panels. In one particular embodiment in which the panel has an upper, perforated screening section (16.1) for performing a screening action and an operatively lower section (16.2) beneath the screening section, the upper section is of molded, virgin polyurethane and the lower section comprises a reinforcing frame (12) and recycled polyurethane molded about the reinforcing frame. The invention envisages the use of blends of virgin and recycled polyurethane as well as method of manufacturing screen panels and methods of handling worn screen panels.

7 Claims, 1 Drawing Sheet

SCREEN PANELS

BACKGROUND TO THE INVENTION

This invention relates to screen panels, and in particular to screen panels used in vibratory screening operations.

In a vibratory screening operation, material which is to be screened is deposited on a vibrating screen deck. It is now common practice for the screen decks to have a frame and for the actual screening surface to be provided by a large number of individual screen panels which are mounted to the frame. It is also common practice for the individual panels to be moulded in a suitable grade of polyurethane.

All screen panels undergo wear in use and have to be replaced when they are no longer able to perform an accurate screening operation. A problem with polyurethanes is that they give off toxic isocyanate gas when incinerated. For this reason material processing plants where screening operations are carried out, such as mine processing plants in which mined ore is processed, tend merely to dump worn panels at large dumpsites rather than incinerating them. However modern mining regulations prohibit such dumping and this means that mine operators are obliged to find ways to deal with the polyurethane employed in worn screen panels.

SUMMARY OF THE INVENTION

According to the present invention, there is provided a screen panel which includes moulded polyurethane at least part of which is recycled.

The term "recycled" in this specification refers to polyurethane material which has been recovered from other moulded polyurethane products. These may or may not be other screen panels.

The screen panel may for instance have an operatively upper, perforated screening section for performing a screening action in use and an operatively lower section beneath the screening section, the upper section being of moulded polyurethane and the lower section comprising a reinforcing frame and polyurethane moulded about the reinforcing frame, at least part of the polyurethane of the lower section being recycled. In this case, the upper section of the panel may comprise moulded, virgin polyurethane, all the polyurethane in the lower section being recycled. The polyurethane in the upper section may have a colour different from that of polyurethane in the lower section.

It is within the scope of the invention for the screen panel to comprise a blend of virgin and recycled polyurethane.

It is also within the scope of the invention for the screen panel to include recycled polyurethane recovered from other screen panels.

According to a second aspect of the invention there is provided a method of manufacturing a screen panel which comprises the steps of recovering polyurethane from other products and reprocessing and remoulding such polyurethane to form at least a part of the screen panel.

According to a third aspect of the invention there is provided a method of manufacturing a screen panel of the type including a reinforcing frame and moulded polyurethane covering the frame and providing a perforated screening surface, the method including the step of using recycled polyurethane to form at least a part of the moulded polyurethane. In this case the recycled polyurethane may be moulded onto the frame to form an operatively lower section of the screen panel and virgin polyurethane is moulded onto the lower section in order to form an operatively upper, screening section of the screen panel. The method may be carried out such that the virgin polyurethane cross-links with the recycled polyurethane, and different colourants may be included in the virgin polyurethane and in the recycled polyurethane.

According to a fourth aspect of the invention there is provided a method of manufacturing a screen panel which comprises the steps of recovering polyurethane from other products, blending the recovered polyurethane with virgin polyurethane to form a polyurethane blend, and moulding the polyurethane blend to form at least a part of the screen panel.

According to a fifth aspect of the invention there is provided a method of handling worn screen panels which include moulded polyurethane, the method comprising the steps of recovering polyurethane from the worn screen panels, reprocessing the recovered polyurethane and making new screen panels which incorporate the recovered and reprocessed polyurethane.

BRIEF DESCRIPTION OF THE DRAWINGS

The invention will now be described in more detail, by way of example only, with reference to the accompanying drawings in which:

FIG. 2 shows a side view of the panel seen in FIG. 1; and.

DESCRIPTION OF THE ILLUSTRATED EMBODIMENT

Figure 1:
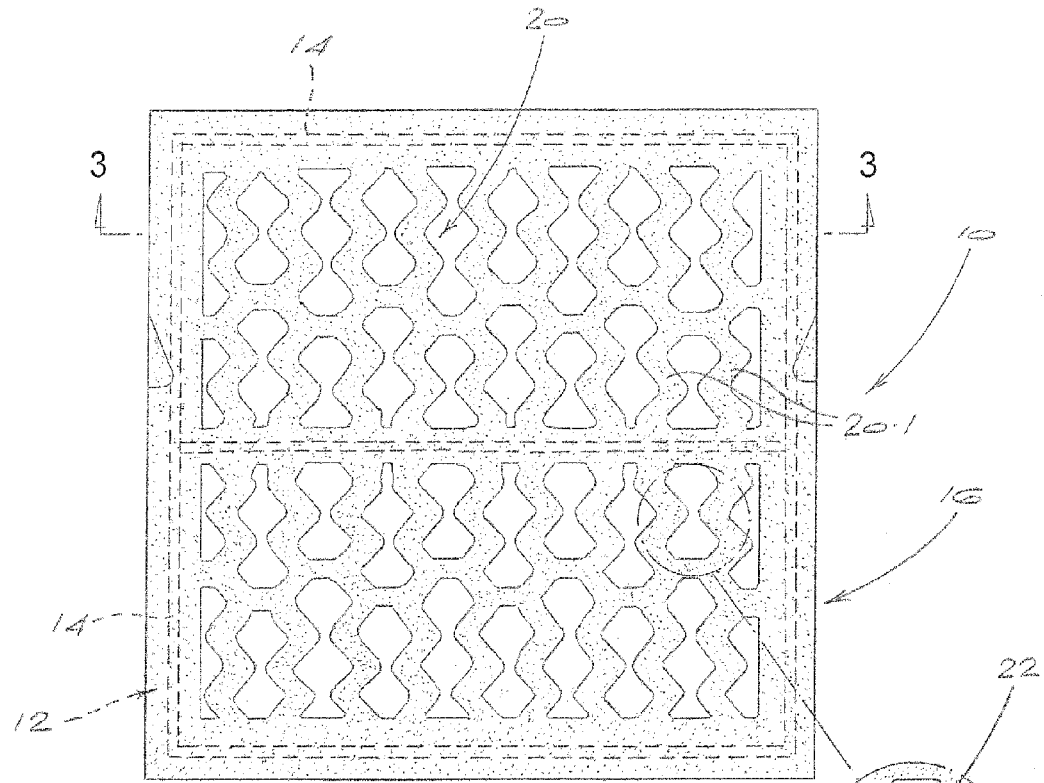
FIG. 1 shows a plan view of a screen panel according to this invention.
Figure 2:
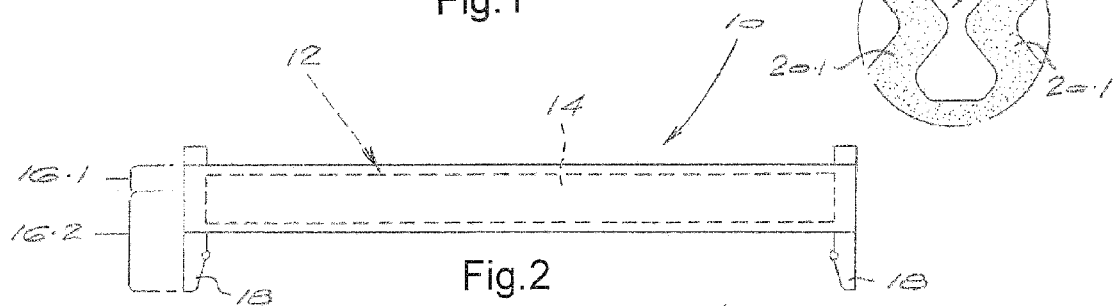
Figure 3:
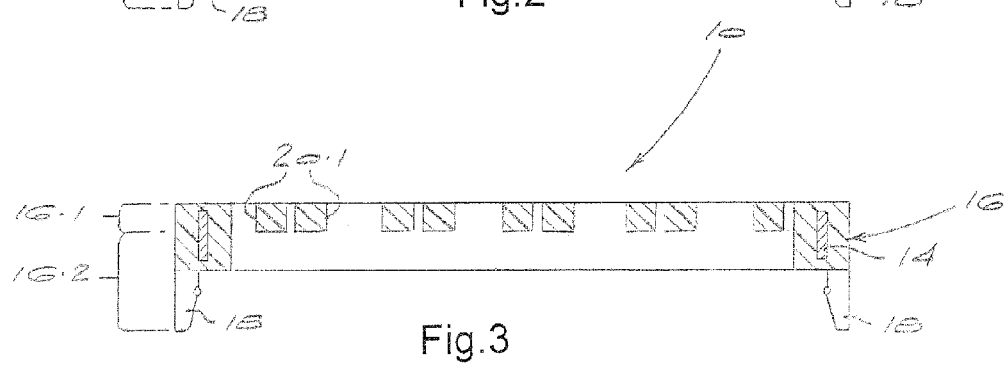
FIG. 3 shows a cross-section at the line 3-3 in FIG. 1.

The drawings show a square screen panel 10 of generally conventional appearance. It includes an internal frame 12 fabricated from elongate steel elements 14. The frame 12 is covered by a moulded lining 16 of a suitable polyurethane.

The moulded polyurethane is in two sections, namely an operatively upper section 16.1 and an operatively lower section 16.2. The lower section 16.2 lines at least the lower parts of the steel elements 14 and also provides projecting pegs 18 which are, in operation, used to locate and mount the panel 10 on the conventional frame of the screen deck of a vibratory screening apparatus.

The upper section 16.1 provides a perforated, flexible screening surface 20 and, in this embodiment, also lines the upper parts of the steel elements 14. The screening surface 20 is composed of elongate, zig-zag elements 20.1 extending generally parallel to one another and spanning across the frame 12. The undulations of the elements 20.1 are regular, but the undulations of adjacent elements are out of phase with one another, with the result that generally rectangular openings 22 are formed at intervals between the elements. Those skilled in the art will understand that these openings, which form the perforations or screen apertures of the screening surface 20, are dimensioned to suit the screening duty which the panel is to perform in use.

The geometry of the panel, together with the grade of polyurethane which is used, provides the elements 20.1 with a degree of resilient flexibility both in a vertical and a horizontal sense. Depending on the application in which the panel is to be used, the virgin polyurethane may be relatively hard or relatively soft.

In accordance with a preferred embodiment of the present invention, the polyurethane which is used in the lower section 16.2 is recycled and remoulded. In practice the invention envisages the following:

screen panels which have become worn to the point of being unserviceable and which have been removed from duty are recovered. This could be from a dump site where they have previously been dumped;

the polyurethane is stripped from the frames 12 and the frames are if necessary cleaned;

the recovered polyurethane is reprocessed by re-granulating or pelletising it and otherwise treating it as necessary to render it suitable for remoulding; and the recovered and reprocessed polyurethane is returned to injection moulding equipment which is used to remould the polyurethane, by an injection moulding process, onto frames 12. These may be frames which have been recovered, or new frames.

The screen panels, partially manufactured by the sequence of steps mentioned above, may then be stockpiled for later use or they may be taken immediately for the final moulding step described below.

In the final moulding step virgin polyurethane is injection moulded both onto the upper parts of the frame elements 14 and to form the screening surface 20, i.e. to form the upper section 16.1. This step is carried out in such a away that the newly moulded, virgin polyurethane cross-links with the remoulded polyurethane in the lower section 16.2 to provide a structure in which the virgin and recycled polyurethane form an integral mass.

In some versions of screen panel, the upper sections of the panels are composed entirely of flexible, moulded, virgin polyurethane, i.e. the upper sections contain no part of the internal steel reinforcement. In such cases, the steel reinforcement is incorporated solely in the lower section or chassis of the screen panel.

In order to distinguish panels manufactured in accordance with the invention from other panels, for example conventional panels incorporating only virgin polyurethane which has been moulded for the first time, it is envisaged that the virgin polyurethane used in the upper section may have a different colour from the recycled polyurethane in the lower section. In order to achieve this suitable, different colourants may be included in the polyurethanes of the upper and lower sections prior to moulding.

It is recognised that recycled and remoulded polyurethane will not, in general, have the same properties of resilient flexibility and longevity as virgin polyurethane and that a remoulded screening surface will accordingly not operate as well as virgin polyurethane in an actual screening operation. For this reason it is preferred to use virgin polyurethane in the moulding of the upper section 16.1. In some situations it is however possible for all the polyurethane in the screening panel, i.e. in both the upper and lower sections, to be recycled and remoulded. In this case the remoulding may take place in a single step.

The invention also envisages another technique in which the polyurethane which has been recovered and reprocessed is blended with virgin polyurethane to form a mixture which can then be moulded as required in order to form both the upper and lower sections or either one of the sections.

An important benefit of the invention as exemplified above is the fact that it provides a method to use polyurethane from worn screen panels, and thereby alleviate the problems associated with getting rid of it safely. It is also envisaged that the use of remoulded polyurethane, at least in the lower sections of the screen panels, may enable the cost of producing screen panels to be reduced.

Although specific mention has been made of remoulding polyurethane recovered from worn screen panels, it is within the scope of the invention to remould polyurethane, of suitable grade, recovered from sources other than worn screen panels.

The illustrated screen panel 10 has a three-dimensional configuration similar to screen panels in the applicant's VR range of screen panels. It will however be understood that the principles of the invention are equally applicable to screen panels according to other designs, for example applicant's VR-X design.

The invention claimed is:

1. A screen panel which includes moulded polyurethane at least part of which is recycled, the panel having an operatively upper, perforated screening section including elongate, resiliently flexible screen elements extending generally parallel to one another for performing a screening action in use and an operatively lower section beneath the screening section, the upper section being of moulded polyurethane and the lower section comprising a reinforcing frame and polyurethane moulded about the reinforcing frame, wherein the polyurethane of the lower section is recycled and remoulded onto the frame and the elongate screen elements are included entirely in the upper section the polyurethane of which is moulded, virgin polyurethane.

2. A screen panel according to claim 1 wherein the polyurethane in the upper section has a colour different from that of polyurethane in the lower section.

3. A screen panel according to claim 1 wherein the screen panel includes recycled polyurethane recovered from other screen panels.

4. A method of manufacturing a screen panel having an operatively upper, perforated screening section for performing a screening action in use and an operatively lower section beneath the screening section, the upper section being of moulded polyurethane and the lower section comprising a reinforcing frame and polyurethane moulded about the reinforcing frame, wherein recycled polyurethane is moulded onto the frame to form the operatively lower section of the screen panel and virgin polyurethane is moulded onto the lower section in order to form the operatively upper section of the panel.

5. A method according to claim 4 wherein different colourants are included in the virgin polyurethane and in the recycled polyurethane.

6. A method according to claim 4 wherein the polyurethane which is moulded onto the frame to form the operatively lower section of the screen panel is polyurethane recovered from products other than screen panels.

7. A method according to claim 4 wherein the polyurethane which is moulded onto the frame to form the operatively lower section of the screen panel is polyurethane recovered from worn screen panels.

\* \* \* \* \*